Patented Aug. 2, 1932

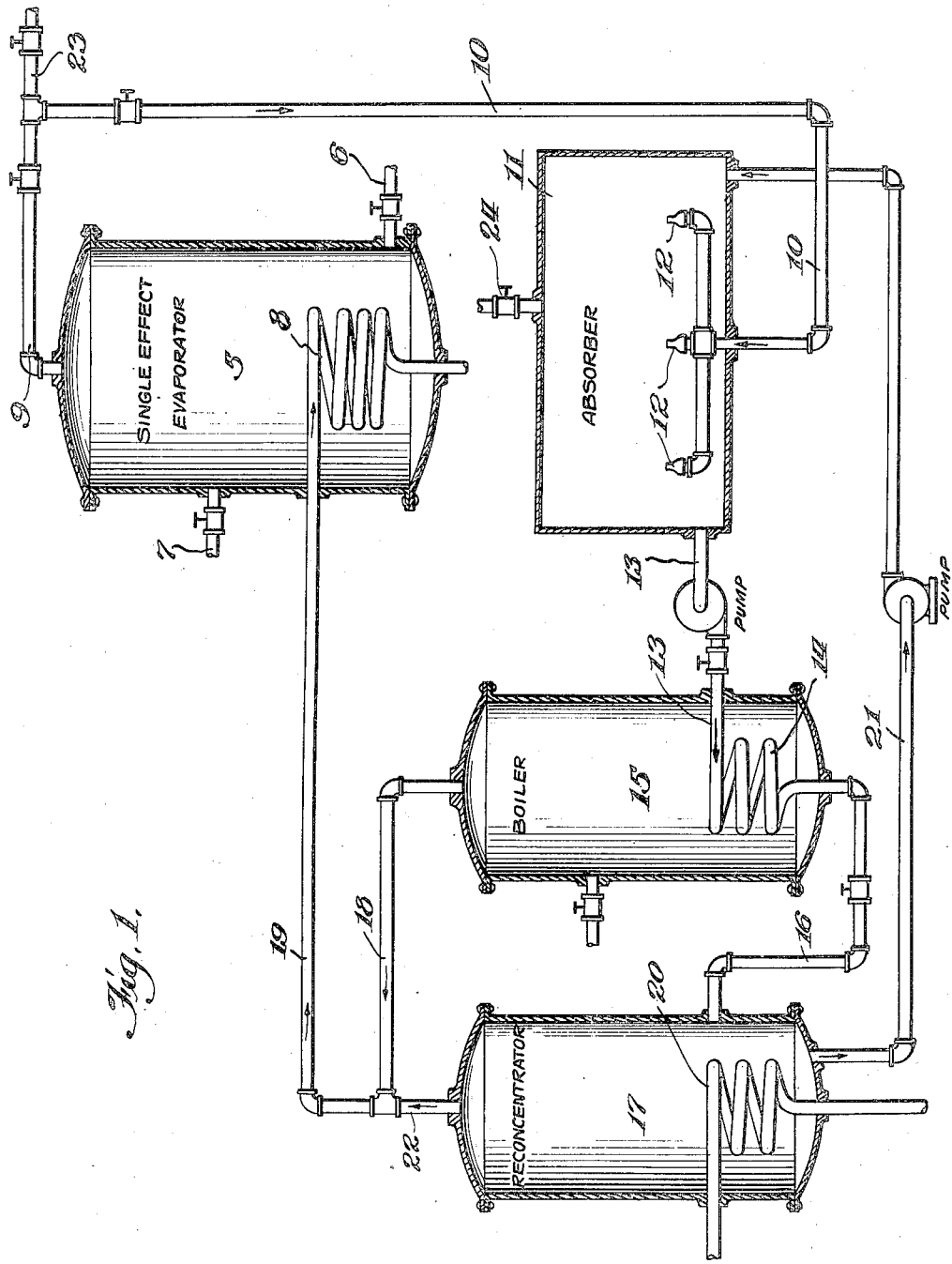

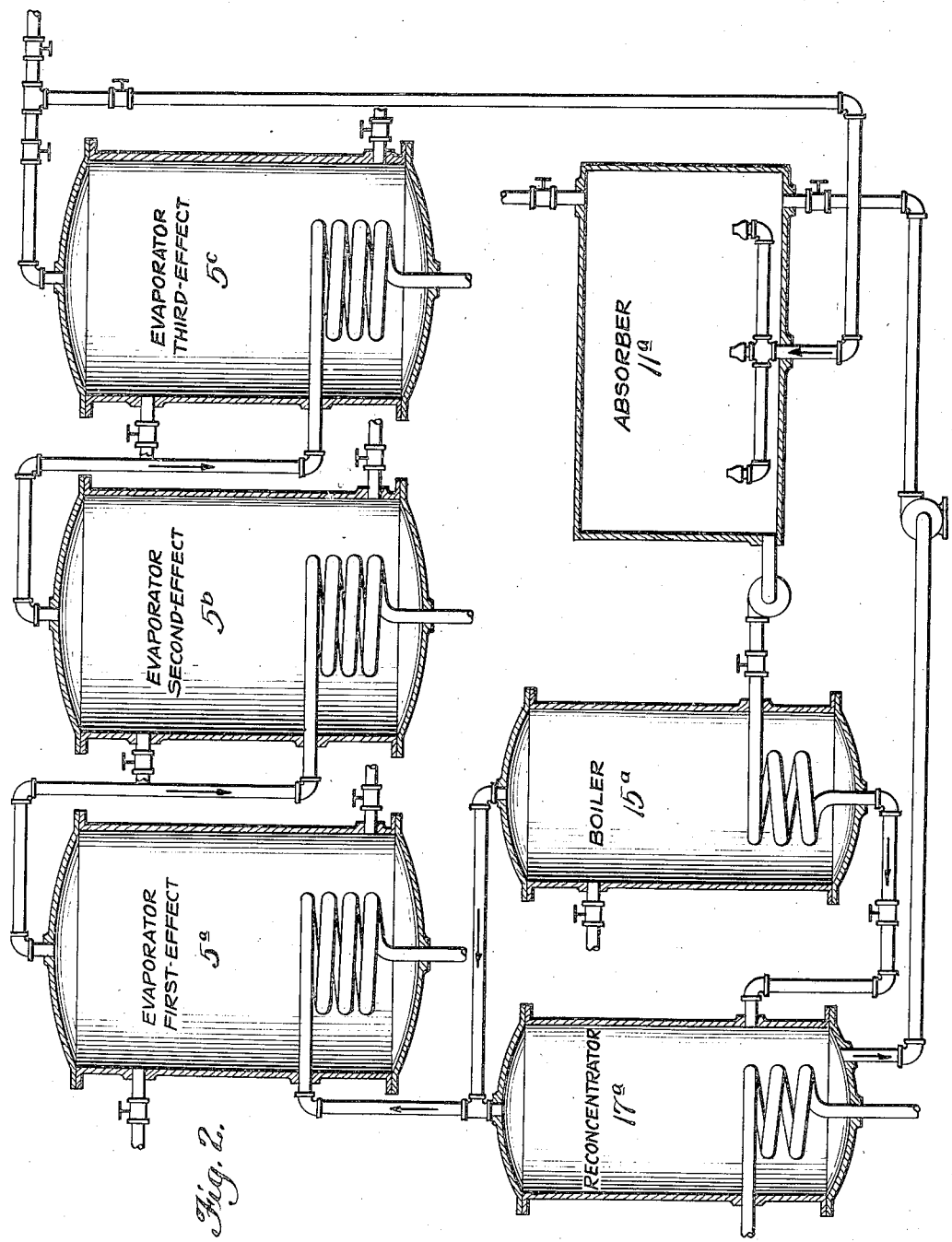

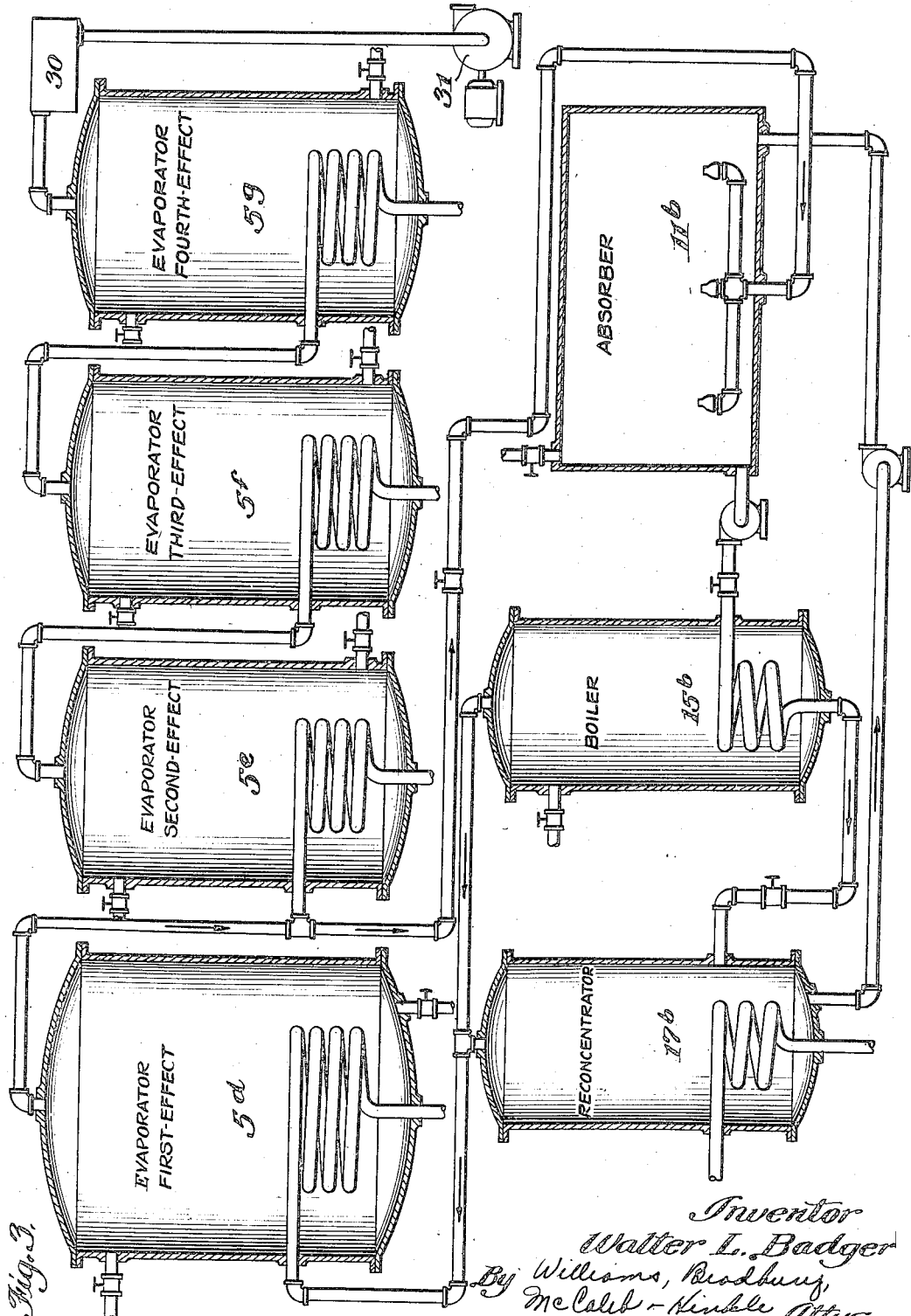

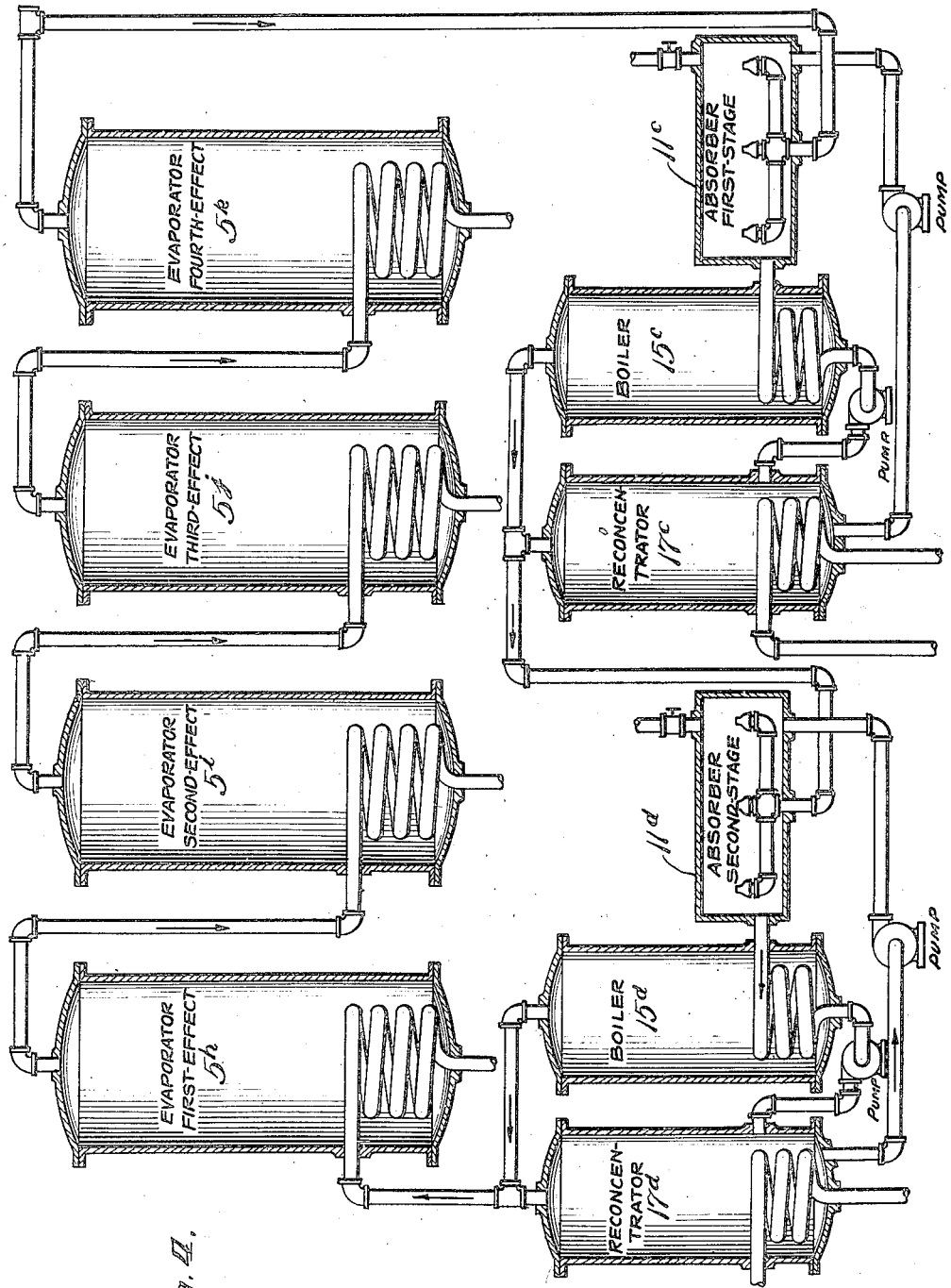

1,869,651

UNITED STATES PATENT OFFICE

WALTER L. BADGER, OF ANN ARBOR, MICHIGAN, ASSIGNOR TO SWENSON EVAPORATOR COMPANY, OF HARVEY, ILLINOIS, A CORPORATION OF ILLINOIS

EVAPORATOR

Application filed August 20, 1928. Serial No. 300,765.

My invention relates to evaporators.

It relates particularly to and will be illustrated and described in connection with evaporators employing steam as the heating medium.

One of the objects of my invention is to provide an improved method of operating evaporators.

Another object is to increase the efficiency of an evaporator system.

Another object is to utilize the heat from the evaporator to produce heat therefor, i. e., heat regeneration.

Another object is to provide a more efficient evaporator system that is simple, reliable and effective.

Other objects and advantages will hereinafter appear.

Several typical embodiments of my invention are more or less diagrammatically illustrated in the accompanying drawings wherein.

Fig. 1 shows a single effect evaporator with a single stage of heat regeneration;

Fig. 2 shows a triple effect evaporator with single stage heat regeneration;

Fig. 3 shows a multiple effect evaporator with single stage heat regeneration across one effect only; and Fig. 4 shows a multiple effect evaporator with two-stage heat regeneration.

In the practical application of my invention I make use of one of the general properties of all solutions, viz., that its boiling point at any particular pressure is higher than the boiling point of the pure solvent at the same pressure. The difference between the boiling point of any solution and the boiling point of its pure solvent is generally known as the "elevation" in boiling point of the solute material. One of the consequences of this property is that if the vapor of the solvent at any particular temperature and pressure be passed into the solution at a temperature below its boiling point, the vapor will condense, diluting the solution and liberating its latent heat. The result is that the temperature of the solution is raised above the temperature of the vapor. Thus, for instance, a saturated calcium chloride (Ca Cl$_2$) solution boils at approximately 250° F. at a pressure of one atmosphere, while the boiling point of pure water (the solvent) at this pressure is 212° F. If then steam at one atmosphere pressure and 212° F. temperature be blown into a saturated solution of calcium chloride, the calcium chloride solution can be heated to 250° F. with no other supply of heat than the steam whose temperature is 212° F.

In utilizing the well-known principles of heat regeneration outlined above to evaporator operation, my invention contemplates the use of the vapors from an evaporator to dilute a solution the temperature of which is materially raised by such dilution and utilizing this hotter dilute solution to boil water or other suitable substance to produce steam for use in heating the evaporator. The dilute solution, which has been cooled by giving up its heat thus to generate steam, is reconcentrated by heating the same from a suitable extraneous source and returned again to be diluted and have its temperature raised from contact with the vapors from the evaporator. The steam generated by the hot dilute solution and the steam generated in the reconcentration of that dilute solution are combined and both utilized in heating the evaporator. Thus part of the steam utilized to heat the evaporator is obtained directly from the solution used in the heat regeneration cycle and part obtained from a substance that is extraneous to or independent of the solution used in the regeneration cycle.

With this general introduction the various drawings will be explained.

In Fig. 1 a single effect evaporator 5 is employed to evaporate any appropriate solution, the desired product being the concentrate which may be withdrawn from a suitable outlet 6. The solution to be evaporated may be introduced through an inlet 7. The evaporator is provided with a suitable heater 8, which, for the purpose of illustration, is shown as a simple coil. The water vapor driven off by the heating of the solution is removed from the evaporator through a vapor outlet 9.

The vapor from outlet 9 is conducted through a pipe 10 into an absorber 11 and there blown through nozzles 12 into a solution of calcium chloride. The calcium chloride solution is thereby diluted with the result that its temperature rises above that of the hot vapor from the evaporator. This hot diluted solution flows through a pipe 13 into the coil 14 of a boiler or steam generator 15 and from thence through a pipe 16 into a small auxiliary evaporator or reconcentrator 17. Boiler 15 contains water which is converted into steam by the hotter dilute calcium chloride solution supplied to heater 14 from absorber 11. The steam thus generated in boiler 15 passes through pipes 18 and 19 to the heater 8 of the main evaporator. The dilute and now cooler solution of calcium chloride is reconcentrated in auxiliary evaporator 17 wherein the required heating steam supplied from any suitable external source is applied by a heating coil 20. The reconcentrated calcium chloride solution returns to the absorber through pipe 21 while the vapor driven off in the concentrating process passes through pipe 22 into pipe 19 where, in conjunction with the steam from boiler 15 it flows to the heater of the main evaporator. Thus the external source for supplying steam to the auxiliary evaporator or reconcentrator is the sole source of heat for the entire cycle.

If it is impossible or inadvisable to absorb all of the vapor from the main evaporator some of it may be allowed to escape through pipe 23 to atmosphere, or to a condenser or to any other desired steam consuming equipment. The absorber may be maintained at the desired pressure by a vent 24.

One typical example will suffice to illustrate the operation of my improved system.

Let it be assumed that the single effect main evaporator of Fig. 1 is operating at atmospheric pressure and is heated by steam in its heater 8 at five pounds gauge. The vapor delivered from this evaporator through pipes 9—10 to absorber 11 will then be at a pressure of one atmosphere and 212° F. temperature. With the absorber at atmospheric pressure and filled with a 42% solution of calcium chloride the injection of the 212° F. vapor momentarily diluting a portion of the solution and liberating its latent heat can heat the dilute solution to 250° F., its boiling point. In order to maintain this condition sufficient concentrated, say 75%, solution of calcium chloride must be continuously added to the absorber to maintain the contents thereof at a 42% solution.

The 42% solution is circulated from absorber 11 into the heating coil of boiler 15, which is fed with water through its supply connection. The 250° F. solution of calcium chloride flowing through the heater of boiler 15 can heat the water therein to a temperature of 225° F. at five pounds gauge, which is the temperature and pressure assumed for the desired operation of the evaporator. Consequently the steam from boiler 15, at the proper pressure and temperature, flows to the heater of the main evaporator through pipes 18—19. The solution of calcium chloride that has given up its heat to the water in boiler 15 is pumped into the evaporating chamber of reconcentrator 17, which is also maintained at a pressure of five pounds gauge. In the reconcentrator the extraneous heat from coil 20 evaporates the calcium chloride solution to a 75% solution which, in this reconcentrated condition is fed back to the absorber through pipe 21. Since the 75% calcium chloride solution boils at 330° F. at five pounds gauge it is necessary to supply steam to coil 20 at 125 pounds gauge and 352° F. in order to effect satisfactory evaporation. The saturated steam at five pounds gauge and 225° F. from boiler 15 and the superheated steam at 330° F. and five pounds gauge from reconcentrator 17 combine to deliver to main evaporator 5, steam at five pounds gauge and with some superheat. The precise degree of this superheat will depend upon the ratio in which the steam from the boiler and the reconcentrator are mixed and in the radiation losses from piping, etc.

In the operation of the usual single effect evaporator arrangement the ordinary standard is considered to be the evaporation of one pound of water per pound of steam applied. On the other hand, according to my improved cycle, if we assume that one pound of steam per minute is withdrawn from evaporator 5 and sent to the absorber, there can be generated in boiler 15 approximately one pound of steam per minute and there can be removed from the calcium chloride solution in reconcentrator 17 approximately one pound of steam per minute. Consequently evaporator 5 will receive approximately two pounds of steam per minute (half from the boiler and half from the reconcentrator) and will evaporate two pounds of water per minute. One pound of the water evaporated in evaporator 5 is, as previously stated, sent to the absorber and the other pound can be sent to a condenser or to some heat utilizing apparatus. The supply of external heat to the system will be approximately one pound of relatively high pressure steam (125 pounds gauge) per minute flowing to reconcentrator 17. Therefore, my improved cycle will enable one single effect evaporator to evaporate two pounds of water per minute with an extraneous heat supply of one pound of steam per minute, or approximately the efficiency of a double effect evaporator.

In Fig. 2 the same cycle is shown applied to a triple effect evaporator comprising the three single evaporators 5a, 5b, and 5c connected in series in the usual manner. The third effect evaporator 5c discharges, at least a part of its vapor into an absorber 11a as before. The hotter calcium chloride solution from absorber 11a is utilized to generate steam in boiler 15a and is reconcentrated in reconcentrator 17a and is returned to the absorber in the same manner as heretofore described. Also as in the cycle previously described, the combined steam from boiler 15a and reconcentrator 17a flows to the first effect evaporator 5a.

In Fig. 3 a similar cycle is shown applied to a quadruple effect evaporator wherein the vapor for the absorber is derived from the steam line between the first and second effects. In this arrangement the first effect evaporator 5d is operated at atmospheric pressure while the other evaporators 5e, 5f, and 5g are operated at a reduced pressure, the partial vacuum in the last effect being produced by a suitable condenser 30 and vacuum pump 31. As before the vapor from evaporator 5d is blown into the calcium chloride solution in absorber 11b, the solution is utilized to generate steam in boiler 15b and is reconcentrated in reconcentrator 17b and returned to the absorber. The combined steam from the boiler and the reconcentrator serves to heat the first effect evaporator. The only extraneous source of heat is that required to operate the reconcentrator.

Fig. 4 shows a multiple effect evaporator with an arrangement providing two stages or steps of heat regeneration. Such a system may be used in instances where the steam at the pressure delivered by the last effect evaporator will not heat the solution in one absorber sufficiently high to generate steam for the first effect evaporator. In this arrangement the main evaporators 5h, 5i, 5j, and 5k are connected in multiple in the ordinary well known manner. The steam from evaporator 5k is blown into calcium chloride solution in the first stage absorber 11c and is utilized to generate steam in boiler 15c, concentrated in reconcentrator 17c and returned to absorber 11c. But, instead of passing the steam from boiler 15c and reconcentrator 17c to one of the main evaporators as heretofore described, the combined steam is blown through the calcium chloride solution of a second stage absorber 11d. In this second stage of heat regeneration the hot solution from absorber 11d is utilized to generate higher temperature steam in boiler 15d and is concentrated in reconcentrator 17c. The higher temperature steam from the boiler and reconcentrator of the second stage is fed to the heater of the first effect evaporator 5h.

The number of evaporator effects and the number of stages of heat regeneration may be varied to suit different conditions and the vapor or steam withdrawn for use in the absorbers may be taken from between any two effects. Other substances than calcium chloride, having high elevations in boiling point may be used, such as sodium hydroxide, potassium hydroxide, or other substances having the requisite physical and chemical properties. And many modifications in the arrangement of evaporators may be utilized in the practice of the process or method herein set forth.

Having explained the characteristics and nature of my invention and illustrated and described embodiments that may be utilized in its practice, what I claim and desire to secure by United States Letters Patent is as follows:

1. The method of operating an evaporation cycle consisting in passing the vapor driven off in the evaporator into contact with a solution that elevates its temperature because of the presence of the vapor, passing the resultant hotter dilute solution to a steam generator to generate steam extraneous to the solution, passing the dilute solution from the steam generator to a reconcentrator, supplementing in the reconcentrator the heat liberated by the reconcentration of the solution with additional heat, utilizing the steam from both the steam generator and the reconcentrator to provide heat for the evaporation cycle, and returning the reconcentrated solution after concentration into contact with vapor from the evaporator cycle.

2. A system for evaporating solutions comprising an evaporator, an absorber wherein the vapor driven off in the evaporator is brought into contact with a solution that elevates its temperature because of the presence of the vapor, a steam generator to which the dilute higher temperature solution is passed to generate steam, a reconcentrator which is extraneous to the steam generator and wherein the dilute solution from the steam generator is passed to raise its concentration and from which the reconcentrated solution is returned to the adsorber, and connections for passing steam from both the steam generator and the reconcentrator to the evaporator.

3. An evaporator system comprising an evaporator, an absorber connected to the evaporator and in which the vapors driven off from the evaporator are brought into contact with a solution of a substance having a high elevation in boiling point, a steam generator to which the dilute hotter solution from the absorber is passed as a heating medium to produce steam extraneous to the solution, a reconcentrator provided with extraneous heat for reconcentrating the solution for return to the absorber, and piping for conveying the steam from the steam generator and the reconcentrator to the evaporator.

4. A method of operating evaporators consisting of passing the vapor driven off in an evaporator into contact with a solution of a substance having a high elevation in boiling point, utilizing the resultant dilute hotter solution to generate steam extraneous to the solution, applying heat to the solution to reconcentrate it by generation of steam, and passing the steam thus generated into contact with a solution of a substance having a high elevation in boiling point to generate steam at a higher temperature than that obtainable by the contact of the vapor from the evaporator with the first solution.

5. The method of operating evaporators consisting of passing the vapor driven off in the evaporator into contact with a solution that elevates its temperature because of the presence of the vapor, utilizing the resultant hotter dilute solution to generate from a fluid different from that in the regeneration cycle, steam for the evaporator, reconcentrating the solution and returning it into contact with the vapor, and utilizing the steam driven off during the reconcentration of the solution as part of the heating medium for the evaporator.

6. The method of operating an evaporator by passing the vapor through a heat regenerating cycle in which the diluting action of the vapor elevates the temperature of a solution, utilizing the higher temperature dilute solution to generate steam from a fluid different from the solution, reconcentrating the solution after heat has been taken therefrom in the generation of steam, utilizing, to heat the evaporator, the steam generated by the heat of the dilute solution and also that liberated in its reconcentration, and utilizing the reconcentrated solution as the solution to be diluted by vapor from the evaporator.

In witness whereof, I hereunto subscribe my name this 9th day of August, 1928.

WALTER L. BADGER.